United States Patent [19]

Andrews, Jr. et al.

[11] 4,092,683
[45] May 30, 1978

[54] DUAL-MODE DEMODULATOR FOR MOVEMENT OF A SERVO HEAD

[75] Inventors: Thomas L. Andrews, Jr., Santa Clara; Charles E. Mendenhall, San Jose, both of Calif.

[73] Assignee: Sperry Rand Corporation, New York, N.Y.

[21] Appl. No.: 713,133

[22] Filed: Aug. 10, 1976

[51] Int. Cl.$^2$ .................... G11B 5/58; G11B 19/14; G11B 21/10
[52] U.S. Cl. .................................................. 360/77
[58] Field of Search .................... 360/77–78, 360/75, 72

[56] References Cited
U.S. PATENT DOCUMENTS

| | | | |
|---|---|---|---|
| 3,292,168 | 12/1966 | Gray | 360/77 |
| 3,404,392 | 10/1968 | Sordello | 360/77 |
| 3,427,606 | 2/1969 | Black et al. | 360/77 |
| 3,534,344 | 10/1970 | Santana | 360/77 |
| 3,691,543 | 9/1972 | Mueller | 360/77 |
| 3,818,502 | 6/1974 | Chien et al. | 360/77 |
| 3,883,894 | 5/1975 | Johnson | 360/77 |
| 3,893,180 | 7/1975 | Braun et al. | 360/77 |

*Primary Examiner*—Alfred H. Eddleman
*Attorney, Agent, or Firm*—Gerald L. Moore

[57] ABSTRACT

An improved demodulator principally for receiving dibits from a servo track and generating a position error signal responsive to the servo head position relative to the track as indicated by the dibit signal. The invention improves the functioning of the demodulator for movement of the servo head at both high and low speeds and when noise is encountered in the dibit signal.

4 Claims, 6 Drawing Figures

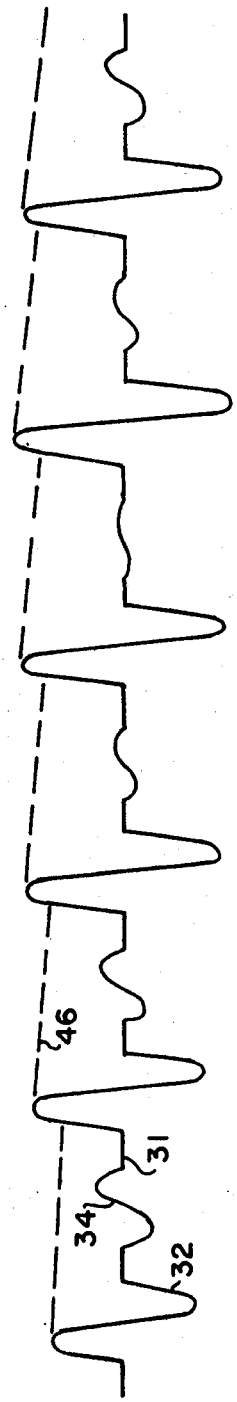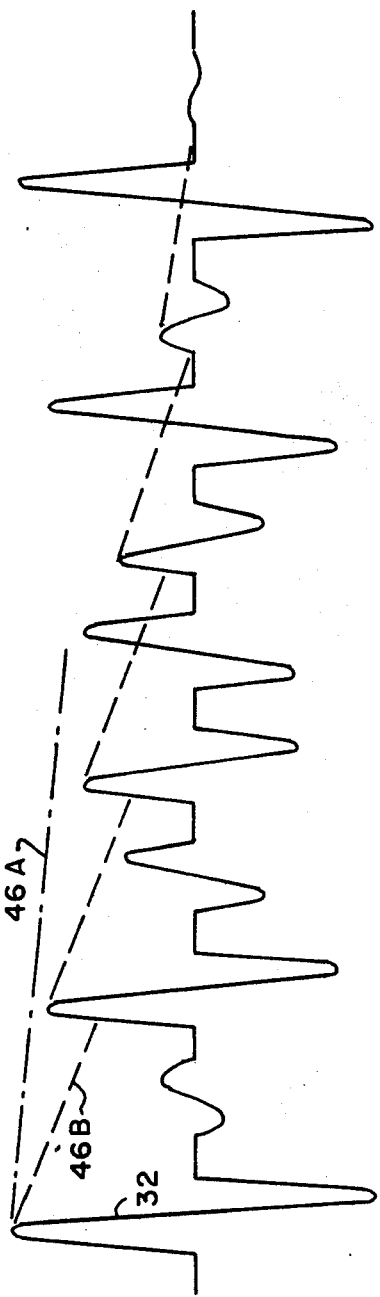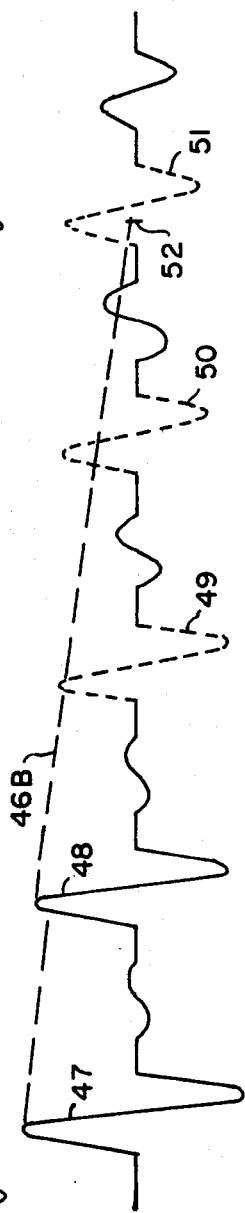
FIG. 2A  FIG. 2B  FIG. 2C  FIG. 2D  FIG. 3.

DUAL-MODE DEMODULATOR FOR MOVEMENT OF A SERVO HEAD

BACKGROUND OF THE INVENTION

This invention pertains to a servo system such as that described in the U.S. Pat. No. 3,534,344, Method and Apparatus for Recording and Detecting Information, issued on Oct. 13, 1970. In a system as described in that patent, a movable member is positioned by a servo system acting responsive to signals detected from a prerecorded servo track. The systems have particular application to disc or other types of magnetic memories for use with computers. Usually the servo head is ganged with a plurality of read/write heads such that when the servo head is correctly positioned over a servo track, the data heads are likewise positioned at desired data track locations. For positioning the servo head over a servo track, an error signal is generated responsive to a pair of dibit signals bordering the track. The dibit signals are recorded to each side of the servo track such that the relative magnitude of the dibit signals detected indicates the degree of alignment of the head relative to the track. These dibit signals are supplied to a demodulator for the generation of an error signal responsive to the relative magnitudes of the dibit signals detected from the servo track.

In the usual manner the demodulator functions to generate a dc output signal responsive to the peak values of the dibit signals at the side of the servo track. Such signal is caused to decay between each dibit pulse and be reset with each subsequent pulse at a value equal to the amplitude of the dibit pulse. It is necessary for the signal to decay between each pulse so as to accommodate the circumstance of the pulses becoming smaller in magnitude as the servo head moves away from that side of the servo track. Naturally the faster the servo head is being moved relative to the track, the more it is necessary for the output signal to decay so as to reach a level below the next dibit pulse magnitude and thereafter be reset higher for an accurate indication of that signal magnitude. Thus for the generation of an accurate output signal in instances of rapid change of the signal, it is necessary that the output pulse decay rapidly between dibit pulses.

However such prerecorded servo signals while having the maximum magnitude closely controlled are subject to noise commonly referred to as dropout. Such noise results from the absence of the dibit signals usually due to a flaw or discrepancy in the media preventing the servo signal from being recorded. Thus it is also necessary for the servo system to function in a manner to accommodate periodic missing dibits which result from discrepancies in the media. One method of such accommodation is to cause the output signal to decay at a slow rate between dibits so as to maintain the resulting error signal at or near the value of the most recent detected dibit which is the most accurate indication of the present position of the servo head in the absence of the subsequent dibit signal. Thus if the dibit signal is absent, the servo system will exhibit an inertial or flywheel effect to more or less maintain the servo head at the position dictated by the last servo track information supplied by the servo transducer until a dibit signal is again detected.

Thus as can be seen, the first requirement that the output signal decay rapidly is counter productive to the need for the servo system to accommodate noise or dropout in systems used up to now. In other words the accommodation of either one of the before-described conditions can only be achieved at the expense of the other requirement in prior systems. It is the purpose of this invention to provide a system which will accommodate both requirements, namely an output signal that will follow a quick decaying dibit signal while yet accommodating noise or dropout in the servo signal.

SUMMARY OF THE INVENTION

A servo system for positioning a movable member in alignment with a servo track formed by prerecorded dibit signals on each side of the track wherein an actuator for moving the member acts in response to an error signal. A servo head transmits the dibit signals to a demodulator for generation of an output error signal responsive to the relative magnitude to the signals. The demodulator generates first and second signals responsive to the magnitude of the dibit signals and alternately charges capacitors to the value of these signals. Switches acting responsive to the velocity of the movable member operate to lower the capacitance of the circuit at higher velocities and raise the capacitance of the circuit at lower velocities thereby to vary the slew rate of the circuit for optimum operation in both speed ranges while enabling the demodulator to accommodate noise or dropout in the dibit signal.

DESCRIPTION OF THE DRAWINGS

FIGS. 2A through 2D show waveforms for the circuit of FIG. 1; and

FIG. 3 shows representative waveforms for prior art circuits with a dropout condition in the dibit signal.

DESCRIPTION OF THE INVENTION

Figure 1:
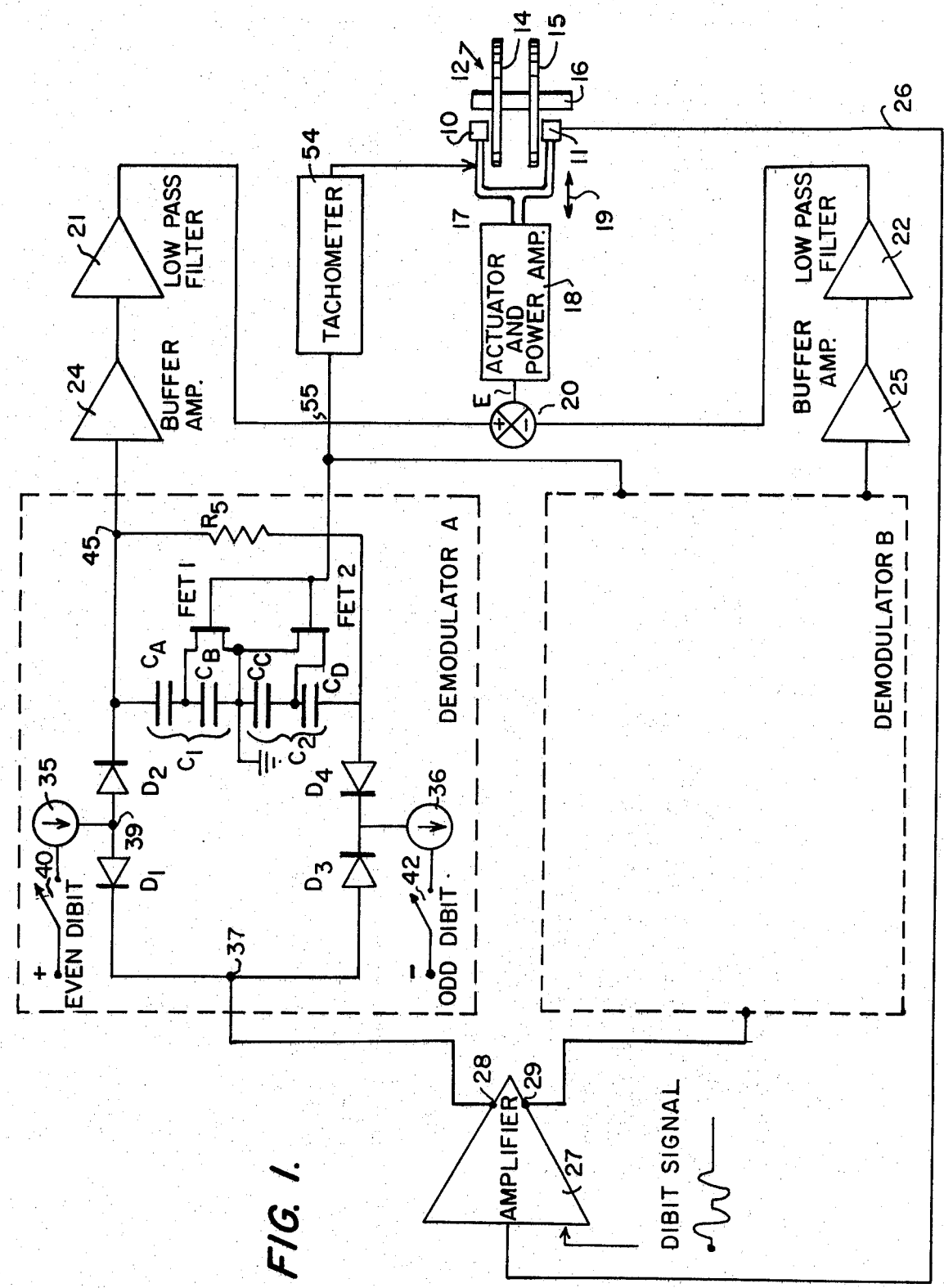
FIG. 1 shows a servo system of the type in which the improvement of the present invention can be applied.

The invention is described for use in a servo system such as that illustrated in FIG. 1 for positioning the transducers 10 and 11 relative to the disc pack 12. The disc pack comprises a pair of magnetic discs 14 and 15 on which data can be recorded. Thus as the discs are rotated about a central shaft 16 and the transducers are translated back and forth radially, data can be recorded on and read from concentric tracks on the disc surface. A motor (not shown) rotates the central shaft 16 to turn the discs.

The transducers 10 and 11 are supported on an arm assembly 17 fixed to an actuator 18 which moves the transducer and arm assembly laterally in the direction of the arrow 19. The actuator is energized by an error signal E received through the juncture 20 and supplied from the demodulators A and B through a pair of low pass filters 21 and 22 and a pair of buffer amplifiers 24 and 25, respectively. This error signal is generated responsive to a position responsive signal supplied by the transducer 11 through the conductor 26 known as the dibit signal. This signal is supplied to the amplifier 27 which supplies through the terminals 28 and 29 of the double-ended amplifier the dibit signal and the component thereof to the demodulators A and B, respectively.

In the manner described in U.S. Pat. No. 3,534,344 identified heretofore, the dibit signals are prerecorded on the disc 15 and comprise a plurality of circular concentric tracks forming position or data indicating reference patterns. These tracks are identified as a plurality of alternating odd and even servo tracks recorded on one surface of the disc 15. Each alternating track has a normally positive flux subject to periodically occurring sets of two flux reversals while the other alternating tracks have a normally negative flux subject to the periodically occurring sets of two flux reversals. The sets of flux reversals of the even tracks are arranged to alternate relative to the sets of flux reversals of the odd tracks.

Thus as the transducer 11 is moved into the proximity of a track it will overlap portions of the odd and even servo patterns immediately adjacent the track and transmit through the conductor 26 a resulting composit dibit signal appearing as waveform 31 in FIG. 2A. As can be seen, the even pulses 32 are alternately interspersed with the odd pulses 34 with the relative magnitudes indicating the position of the transducer 11 and the data track bordered by the dibit patterns. Thus for the waveform FIG. 2A, the transducer 11 is positioned slightly off center and more in alignment with the even dibit pattern than the odd dibit pattern because the even dibit signal is of greater magnitude.

The dibit signal is fed to the demodulator A for the generation of a dc output signal responsive to the magnitude of the even pulses. For this purpose the demodulator comprises a current source 35 connected to supply current through the diodes $D_1$ and $D_2$. Similarly a current source 36 is connected to transmit current away from the circuit through the diodes $D_3$ and $D_4$. These diodes $D_1$ and $D_2$, $D_3$ and $D_4$ are connected to regulate the charge on the capacitive circuit including the charge accumulators or capacitors $C_1$ and $C_2$. Thus the capacitor $C_1$ is charged each cycle to the amplitude of the even pulse and the capacitor $C_2$ is charged each cycle to the amplitude of each odd pulse.

To explain the operation of the demodulator, as the initial pulse 32 is fed to the terminal 37 of the demodulator A, the diode $D_1$ is back-biased and the diode $D_2$ is forward-biased by the resulting voltages thereacross. Thereafter is fed to the switch 38 a pulse signal 40 (FIG. 2A) from a source not shown and timed with the occurrence of the first half cycle of the even dibit as illustrated in FIG. 2C. The pulse 40 serves to close the switch 40. With the switch 38 closed, the current source 35 is caused to transmit current to the terminal 39 which because of the previously described biases on the diodes $D_1$ and $D_2$ serves to charge the capacitor $C_1$ until the charge on that capacitor is equal to the magnitude of the even pulse. At that occurrence $D_2$ will become non-conductive and $D_1$ will become conductive. Thereafter the pulse 40 ceases and with the occurrence of the first half-cycle of the odd pulse 34, a pulse 41 occurs (FIG. 2D) serving to close the switch 42 connecting with the current source 36 to conduct current from the terminal 43. The resulting voltages will forward bias the diode $D_4$ so that current flows through the switch 42 until the charge on the capacitor $C_2$ reaches that of the magnitude of the negative dibit pulse at which time the diode $D_4$ will become non-conductive and $D_3$ will become conductive. In the manner just described the capacitors $C_1$ and $C_2$ are charged alternately to the magnitudes of the even and odd dibit pulses, respectively.

Thus there will be generated at the terminal 45 a voltage signal similar to that illustrated by the dotted line 46 in FIG. 2A representative of the charge on capacitor $C_1$ and responsive to the magnitude of the even dibit pulses 32. It will be noted that between pulses there is a sag in the magnitude of this dc signal because of the current drain through the circuit including the resistor $R_5$. Such a sag or slew rate is necessary to decrease the magnitude of the dc output signal so that as the magnitude of the dibit pulses decreases, the resulting output signal follows that decrease in amplitude to render an accurate output signal. The demodulator B operates in the same manner and incorporates the same circuitry as demodulator A. However the dibit signal supplied to this demodulator is of opposite polarity such that the output signal, in being subtracted from the output signal of demodulator A will serve to cancel out most inaccuracies due to errors, etc. in operation of the circuits because of the components used therein. The low pass filters 21 and 22 tend to smooth out the output signals to generate average value signals approximating the amplitude of the even pulses.

As pointed out before, for purposes of more closely approximating the maximum value of the even pulses, it would be desirable for the resistor $R_5$ to be of high value so that the sag or slew rate between pulses is slight. This would mean that the average value for the signal 46 would be very close to the peak value of the even dibit pulses. However as illustrated in FIG. 2D, if the slope is sufficiently slight because of a low slew rate and the magnitude of the even going pulses 32 is decreasing as would occur as the transducer moves away from that dibit pattern, the waveform 46A will not follow the peaks of the dibit pattern but instead will render an erroneous error signal not responsive to the relative position of the transducer and the even dibit pattern. Thus it is necessary in prior devices that the slew rate be sufficiently large to permit the demodulator output signal to follow the maximum rate of decrease in magnitude of the even dibit pulses. Such maximum rate of decrease occurs when the servo head traverses the servo tracks at the highest velocities.

However as also was pointed out before, another problem with prerecorded servo tracks is noise, that is, while the magnitude of the pulses can be closely controlled, still there always remains the possibility of dropout, i.e., the loss of the dibit pattern. Such is illustrated in FIG. 3 wherein the even dibit pulses 46 and 48 are followed by the lack of dibit pulses which are illustrated by the dotted lines 49, 50 and 51. In other words in the servo pattern, no dibit pulses are detected by the transducer 11 for a period of time. Now it can be seen that the signal 46B in FIG. 4 continues to sag in the absence of dibit pulses and can give a more erroneous indication of the relative position of the transducer and the dibit pattern as indicated by the difference in magnitude at point 52 between the waveform 46B and what would be the magnitude of the error signal if it followed the peak of the dibit signal 51 at that point. Under these circumstances the transducer will be actuated to a new position based on the erroneous signal resulting from the circumstance that no even dibit pattern is being sensed. Thus it can be seen that while a faster slew rate is desired when the change in magnitude of the dibit signals is greater as occurs when the head is moved rapidly across the servo tracks, still too great a sag in the presence of noise will result in the generation of an erroneous error signal also. Past demodulators have attempted to compromise the slew rate to accommodate these circumstances, with the results being less optimum at the least.

In accordance with the present invention, means are provided for decreasing the capacitance of the circuit in the demodulator when the servo head is being moved at the upper ranges of the velocity thereby to increase the slew rate of the output signal for enabling the demodulator to more closely follow the more rapidly changing dibit signals. At lower velocities the capacitance of the demodulators is maintained at a higher level to enable the demodulator to accommodate more efficiently any noise or dropout in the dibit signal. Accordingly the capacitors $C_1$ and $C_2$ (FIG. 1) are divided into the pairs of capacitors $C_A$ and $C_B$, and $C_C$ and $C_D$, respectively. Across the capacitors $C_B$ and $C_C$ there are connected circuits including the FET 1 and FET 2, respectively. These FETs function to short-circuit the associated capacitor when closed.

For energization of the FETs a tachometer 54 is provided which senses the velocity of movement of the head/arm assembly 17. For instance the tachometer can be of the type described in U.S. Pat. No. 3,811,091, Electronic Tachometer, Ha et al, issued on May 14, 1974. Thus whenever the output signal from the tachometer indicates that the velocity is above a predetermined value, a signal is supplied through the conductor 55 to energize the FET 1 and FET 2 for closing thereby shorting out the capacitors $C_B$ and $C_C$.

By the closing of FET 1 and FET 2 there is left only in the demodulator A circuit the capacitors $C_A$ and $C_D$. With this occurrence the resistor $R_5$ becomes a greater influence in discharging the capacitors so as to increase the slew rate of the output signal.

Thus as shown in FIG. 2D with the FETs open the circuit incorporates a greater capacitance causing the slew rate to approximate that of waveform 46A. However at higher velocities with the FETs closed due to the sensing of that velocity by the tachometer 54, the slew rate approximates that of waveform 46B. As can be seen in FIG. 2D, this slew rate is sufficient to accommodate a much faster decrease or change in the dibit signal magnitude so as to generate an output signal representative of the actual error in the position of the servo head relative to the servo track.

However by utilization of the higher capacitance values at lower velocities, there still is accommodated noise in those lower velocity ranges because of the lower slew rate and the fact that a missing dibit will have a smaller effect on the overall magnitude of the output signal. Experience has shown that the circuit should be designed so as to minimize to the extent possible, the velocity range through which the lower capacitance values are utilized so as to make the demodulator more effective in accommodating noise in the dibit signal. However because of the relative simplicity of the circuit, the demodulator functions at greater efficiencies throughout the total velocity range.

The invention claimed is:

1. A servo system for positioning a movable member in alignment with a servo track formed by prerecording cyclic dibit signals to each side of the track, said system comprising in combination:
    an actuator for positioning said movable member responsive to an error signal;
    a servo head for detecting said prerecorded dibit signals;
    a demodulator for receiving said dibit signals from the servo head and generating an output error signal responsive to the relative magnitude of the two dibit signals;
    said demodulator including a capacitive circuit charged by the separate dibit signals;
    means to partially discharge said capacitive circuit between dibit signals to reset said capacitive circuit to receive additional dibit signals;
    means for detecting the charge in said capacitive circuit for generating an error signal for controlling said actuator; and
    means for changing the capacitance of said capacitive circuit to vary the discharge rate thereof.

2. A servo system as defined in claim 1 including a tachometer for detecting and signaling the velocity of movement of said movable member; and
    means for changing the capacitance of said capacitive circuit responsive to the tachometer signal.

3. A servo system as defined in claim 2 wherein said means for changing the capacitance of said capacitive circuit lowers the capacitance when the tachometer signal indicates the velocity has exceeded a predetermined value.

4. A servo system as defined in claim 3 wherein said capacitive circuit includes two pairs of first and second capacitors; and
    switch means connected to close and short out said second capacitors responsive to said tachometer signal.

* * * * *